United States Patent [19]

Willard

[11] Patent Number: 5,013,499

[45] Date of Patent: May 7, 1991

[54] METHOD OF FLAME SPRAYING REFRACTORY MATERIAL

[75] Inventor: David C. Willard, Freeport, The Bahamas

[73] Assignee: Sudamet, Ltd., The Bahamas

[21] Appl. No.: 255,634

[22] Filed: Oct. 11, 1988

[51] Int. Cl.[5] ........................ B05D 1/08; B32B 35/00; F27D 1/16

[52] U.S. Cl. ........................................ 264/30; 264/36; 264/81; 266/281; 427/140; 427/423; 501/88

[58] Field of Search ....................... 264/30, 36, 80, 81; 427/423, 140; 501/88, 49, 55, 67, 118, 121, 122, 132, 133, 128, 104, 154; 266/281

[56] References Cited

U.S. PATENT DOCUMENTS

| | | | |
|---|---|---|---|
| 1,934,263 | 11/1933 | Hacks et al. . | |
| 2,108,998 | 2/1938 | Schori | 91/12.2 |
| 2,741,822 | 4/1956 | Udy . | |
| 2,904,449 | 9/1959 | Bradstreet . | |
| 2,943,951 | 7/1960 | Haglund . | |
| 3,415,450 | 12/1968 | Hawk | 239/85 |
| 3,416,779 | 3/1966 | Cambell, Jr. . | |
| 3,533,375 | 10/1970 | McConnell . | |
| 3,684,560 | 8/1972 | Brichard et al. . | |
| 3,800,983 | 4/1974 | Brichard et al. . | |
| 4,093,755 | 6/1978 | Dahl et al. | 427/299 |
| 4,192,460 | 3/1980 | Matsuo | 264/30 X |
| 4,411,935 | 10/1983 | Anderson | 427/318 |
| 4,487,397 | 12/1984 | Antonov et al. | 264/30 X |
| 4,489,022 | 12/1984 | Robyn et al. . | |
| 4,497,473 | 2/1985 | Robyn et al. . | |
| 4,542,888 | 9/1985 | Robyn et al. . | |
| 4,546,902 | 10/1985 | Anderson et al. | 222/129 |
| 4,560,591 | 12/1985 | Plumat et al. . | |
| 4,588,655 | 5/1986 | Kushner | 427/423 X |
| 4,593,007 | 6/1986 | Novinski | 427/423 X |
| 4,634,611 | 1/1987 | Browning | 427/423 |
| 4,792,468 | 12/1988 | Robyn et al. | 264/30 X |
| 4,818,574 | 4/1989 | Mottet et al. | 427/426 X |
| 4,865,252 | 9/1989 | Rotolico et al. | 239/8 |

FOREIGN PATENT DOCUMENTS

| | | |
|---|---|---|
| 903711 | 5/1986 | Belgium . |
| 956102 | 10/1974 | Canada . |
| 102083 | 5/1941 | Sweden . |
| 991046 | 5/1965 | United Kingdom . |
| 1151423 | 5/1969 | United Kingdom . |
| 1330894 | 9/1973 | United Kingdom . |
| 1330895 | 9/1973 | United Kingdom . |
| 2035524B | 6/1980 | United Kingdom . |

OTHER PUBLICATIONS

"Ultra-High Temperature Spraying to Coat Metals with Refractories", by P. W. Sherwood, Product Finishing, vol. 14, No. 11, pp. 98-100, Nov. 1961.

"Ultra-High Temperature Spraying-to Coat Metals with Refractories", by P. W. Sherwood, Products Finishing, pp. 54-60, Feb. 1965.

"Flame Sprayed Coatings" by John A. Mack, Materials in Design Engineering, pp. 89-104. Feb. 1966.

"Ceramic Welding-A New Approach to the Production of Refractory Repair Masses", by C. Zvosec and J. Briggs, Iron and Steel Making (I&SM), pp. 43-46, Sep. 1988.

Metal Producing, vol. 33, Sep. 1982, pp. 32-33.

*Primary Examiner*—Jan H. Silbaugh

*Assistant Examiner*—Karen D. Kutach

*Attorney, Agent, or Firm*—Watts, Hoffmann, Fisher & Heinke Co.

[57] ABSTRACT

A method of flame spraying refractory material for in situ repair of, e.g., furnace linings wherein an inert carrier gas incapable of supporting combustion and particles of refractory oxide and combustible metal or other oxidizable material are delivered to a flame spraying apparatus wherein high pressure oxygen aspirates and accelerates the carrier gas-particle mixture; a controlled ratio of 5 to 1 to about 30 to 1 oxygen gas to carrier gas; allows for the use of highly combustible metals and materials such as chromium, aluminum, zirconium, and/or magnesium as heat sources without back-flash and at a deposition rate in excess of 2000 pounds per hour of refractory oxide to yield a deposited refractory mass exhibiting enhanced wear and erosion resistance.

25 Claims, 3 Drawing Sheets

METHOD OF FLAME SPRAYING REFRACTORY MATERIAL

BACKGROUND OF THE INVENTION

1. Technical Field

This invention relates to the repair of worn or damaged refractory linings and, more particularly, to a method of and apparatus for flame spraying refractory materials containing chromium, aluminum and/or magnesium oxidizable particles for in situ repair of these linings.

2. Description Of The Related Art

Metal processing furnaces, ladles, combustion chambers, soaking pits, and the like are lined with refractory brickwork or coating. These linings become eroded or damaged due to the stresses resulting from high temperature service.

It has long been the objective of operators to repair such ovens or furnaces linings in situ while they are hot. Such in situ repair eliminates the need for cool down and heat up time periods, as well as thermal shock damages caused by excessive temperature change.

The technique of flame spraying is well known in the art. By this technique, molten or sintered refractory particles are sprayed from a lance into the furnace under repair. Such a lance may be wrapped in a fiber protective blanket or may be provided with a water cooled outer jacket so as to protect it from the high temperatures encountered during the spraying operation.

Previous flame spraying techniques used pulverized coke, kerosene, or propane gas as a fuel which was mixed with refractory powders and oxygen, and projected against the wall being repaired.

British Patent Specification No. 1,151,423 teaches entraining powdered refractory in a stream of fuel gas. Patent Specification No. 991,046 discloses entraining of powdered refractory material in a stream of oxygen, and using propane as a fuel.

U.S. Pat. Nos. 2,741,822 and 3,684,560 and Swedish Patent No. 102,083 disclose powdered metals as heat sources. These processes allow the formation of shaped masses of refractory by oxidation of one or more oxidants such as aluminum, silicon and/or magnesium in the presence of refractory oxides such as $Al_2O_3$, MgO or $SiO_2$. These processes teach the use of finely divided, oxidizable metal powders having a size below about 50–100 microns. This size oxidizable metal promotes rapid oxidation and evolution of heat so as to liquify or soften the entrained refractory particles as well as to soften the area being repaired. It is taught that these processes are dangerous due to flash-backs. During a flash-back, the reaction can travel back up the lance or the carrying hose to the machine or the operator, and can cause injury as well as disruption of the repair. Flash-backs are a major disadvantage of flame-spraying processes.

British patent application No. GB2035524B teaches a process wherein a carrier gas of air or other inert gas is used to convey a powdered refractory and oxidizable substances to the outlet of a lance where they are mixed with oxygen which was separately conveyed to the outlet of the lance. While overcoming some of the hazard of flame spraying refractory and oxidizable powders, this process results in extremely low deposition rates. The low deposition rate is due to the small quantity of mixture carried in the inert gas, about 0.5 kg in 50 to 100 liters per minute. The large amount of oxidant necessary to overcome that proportion of air adds to the expense of the process and introduces further dangers, such as occur when the materials are mixed together. For instance, the example teaches the use of 40% of metal oxidants in a −100BS mesh form (about 150 microns). This process also consumes very large volumes of oxygen to offset the inert gas carrier in a ratio of about 2:1 to 4:1.

The flame spraying of refractory oxides of aluminum, silicon, and/or magnesium is well known in the art. But when silicon and aluminum/magnesium are used as fuels in conjunction with these refractory oxides, residual silicon ($SiO_2$) is produced so that the resulting deposited refractory masses are not sufficiently refractory to withstand the wear and tear of high erosion environments. Oxidizable powders and refractory powders which would yield more wear resistant deposited refractory masses, such as chromium fuel to deposit residual chromium oxide, and zirconium fuel to deposit zirconia, are highly reactive and have heretofore not been usable in flame spraying methods due to backflashes, etc.

It would be desirable, therefore, to have a method of and apparatus for flame spraying entrained refractory and oxidizable powders which achieves significantly higher deposition rates than obtainable in the past, as well as which allows for the use of oxidizable and refractory powders which, up to now, have been deemed too reactive and too prone to induce back-flashing and large system explosions.

SUMMARY OF THE INVENTION

The invention provides a method of and apparatus for flame spraying refractory material for in situ repair of, e.g., furnace linings. An inert carrier gas incapable of supporting combustion and particles of refractory oxide and combustible metal or oxidizable material are delivered to a flame spraying apparatus wherein high pressure oxygen aspirates and accelerates the carrier gas-particle mixture. A controlled ratio of carrier gas to oxygen allows for the use of highly combustible metal particles such as chromium, zirconium, aluminum and/or magnesium as heat sources without backflash. The method and apparatus allow for a deposition rate in excess of 2000 pounds per hour of refractory oxide to achieve a high quality refractory mass having improved wear and erosion resistance.

The process of the invention allows for the use of chromium, magnesium, zirconium and other highly reactive oxidizable materials and mixtures which impart better chemical, refractory, and high melting point characteristics to the resulting deposited refractory mass than silicon and other low melting point materials.

The apparatus of the invention aspirates and accelerates the entrained particles to provide greater density and lower porosity to the resulting deposited refractory mass, thus improving its wear characteristics.

The method and apparatus of the invention substantially increase the rate of application of the deposited refractory mass as compared to prior art methods and apparatuses, thus reducing the application time thereby rendering the method and apparatus of the present invention desirable in high productivity applications where non-productive down time has a high relative cost.

Accordingly, the invention provides a method of forming a refractory mass wherein a mixture of carrier gas and entrained particles of an oxidizable material and an incombustible refractory material are aspirated into a flame spraying apparatus by means of a high pressure stream of oxygen to form an oxygen-carrier gasoxidizable material-refractory material stream.

As used in the specification and claims, the term carrier gas or inert gas means any gas incapable of supporting oxidation of the oxidizable elements, and includes air as well as the noble gases such as argon.

The aspiration is carried out to provide an oxygen to carrier gas ratio of from about 5 to 1 to about 30 to 1, and, more preferably from about 8 to 1 to about 12 to 1. The ratios of oxygen to carrier gas are delivered at relative pressures so as to accelerate the aspirated particles.

The oxidizable material comprises chromium or aluminum or magnesium or zirconium, and mixtures thereof. The refractory material comprises oxides of chromium or aluminum or magnesium or iron in both oxidative states as well as zirconium or carbon. The oxidizable material comprises about 5 to 20% by weight, preferably 8 to 17% by weight and more preferably about 8 to 12% by weight of the particles in the mixture.

The refractory material may comprise silicon carbide; in such a case the oxidizable material may be silicon, aluminum, chromium, zirconium or magnesium, and mixtures thereof, and comprises 10 to 30%, preferably 15 to 25% by weight of the particles in the mixture.

In all instances, the oxidizable material has an average grain size of less than about 60 microns, and preferably, less than about 20 microns.

The invention also provides an apparatus for forming a refractory mass comprising high pressure oxygen stream aspirating means for aspirating into a flame spraying means, a mixture comprising a carrier gas and entrained particles of an oxidizable material and of an incombustible refractory material to form an oxygen-carrier gas oxidizable material-refractory material stream. The aspirating means may be located anywhere in the flame spraying means up to its outlet. The lance may be insulated or water jacketed against the high temperature environment of use. The apparatus may include means for forming the mixture of the carrier gas and the entrained particles, such as an air or other carrier gas inlet in fluid communication with a particle inlet, such as a screw feed or gravity feed; the means for forming the mixture may be a motor driven impeller to which air or inert gas is added.

These and other features of the invention will be better understood from the following detailed description taken in conjunction with the accompanying drawing.

DETAILED DESCRIPTION OF THE BEST MODES

Figure 1A:
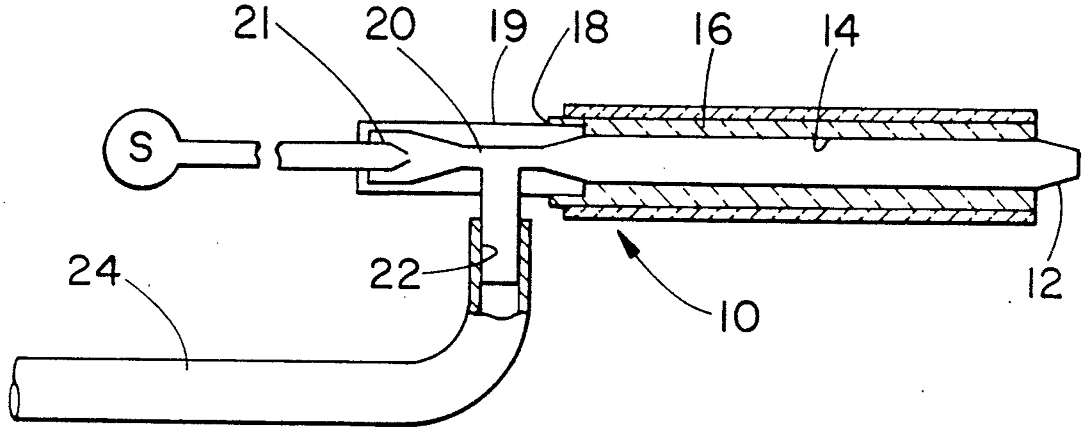
FIGS. 1A and 1B are schematic diagrams in cross-section of two embodiments of the flame spraying apparatus of the present invention.

Referring to FIG. 1A, there is shown generally at 10 a flame spraying lance having an outlet tip 12, a body 14 surrounded by insulation 16, and an inlet end 18. The inlet end 18 of the lance 10 is equipped with an aspirator 19 having a restriction 20 wherein high pressure oxygen from a source S passes through a nozzle 21 to aspirate a mixture of carrier gas and entrained particles from the conduit 24.

Figure 1B:
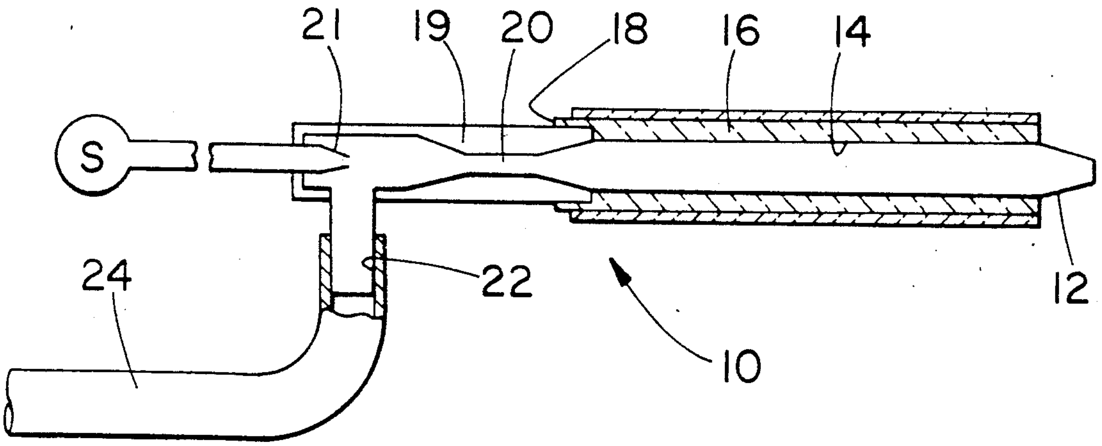

FIG. 1B illustrates another arrangement for aspiration and acceleration of the mixture of carrier gas and particles wherein the nozzle 21 delivers high pressure oxygen from source S to a point midway where conduit 22 enters the aspirator 19.

Figure 2:
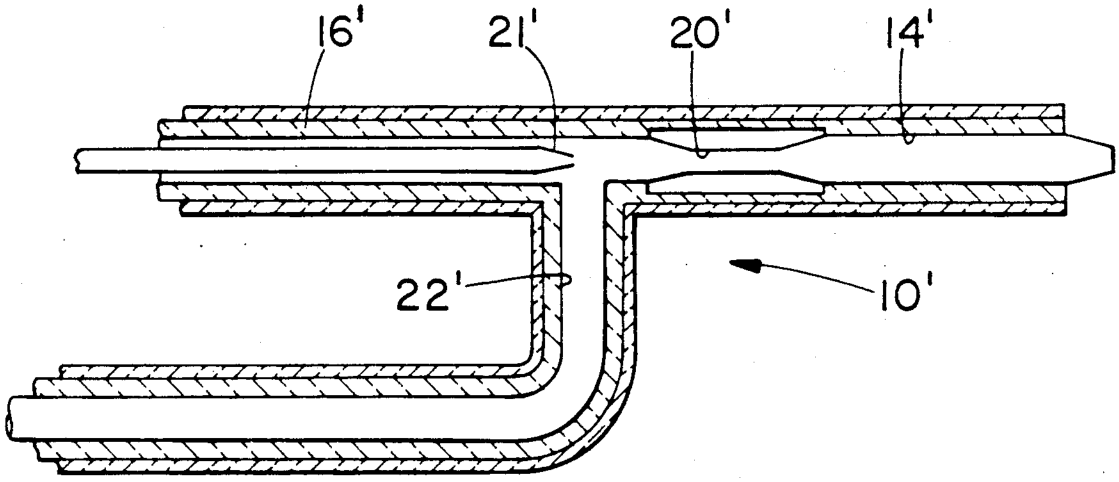
FIG. 2 is a schematic diagram in cross-section of another embodiment of the flame spraying apparatus.

FIG. 2 shows a flame spraying lance 10' similar to that of FIG. 1B, except that instead of the aspirator 19 being located outside the body, the restriction 20' is located within the body 14' of the lance 10', and the entire lance 10' and the conduit 22' are illustrated as being sheathed in insulation 16'. As in FIG. 1B, oxygen is delivered via a nozzle 21' to a point midway where conduit 22' enters the body 14' to aspirate and accelerate the mixture.

Figure 3A:
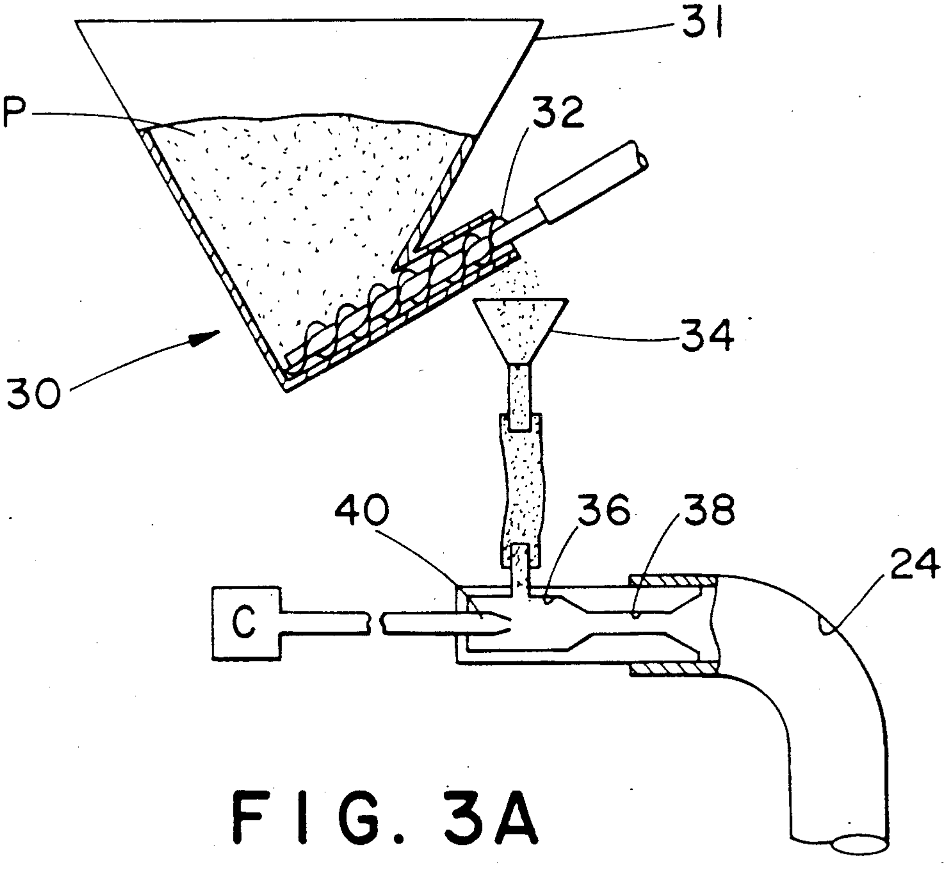
FIGS. 3A, 3B, and 3C are schematic diagrams in cross section of, respectively, a screw-feed, a gravity feed, and a motor driven impeller.
Figure 3B:
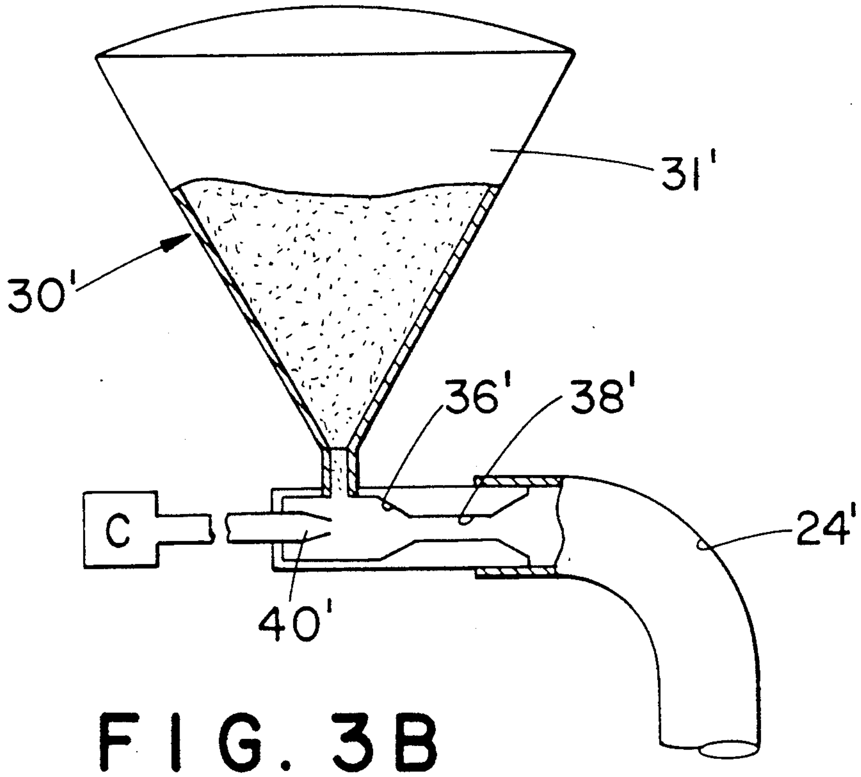
Figure 3C:
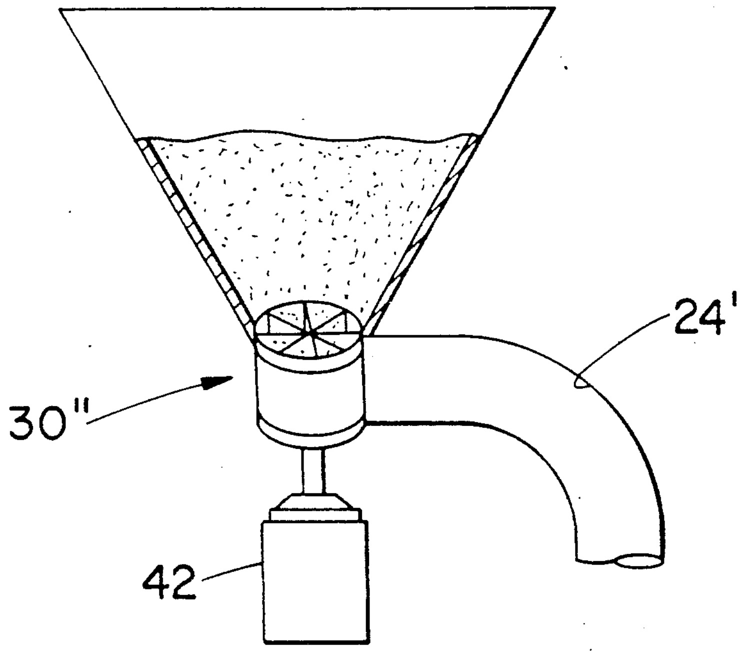

FIG. 3 illustrates the various spraying machines by which a carrier gas and particles are mixed to form a stream to be aspirated by the flame spraying apparatus of the invention. FIG. 3A illustrates a spraying machine 30 having a hopper 31 containing particles P of oxidizable material and refractory material. The hopper 31 is emptied by a screw feed 32 into a funnel 34 in fluid communication with an aspirator 36 having a downstream restriction 38 into which a stream of carrier gas from source C is directed through nozzle 40. The venturi 38 is in fluid communication with conduit 24 to deliver the stream of carrier gas and entrained particles to a lance such as 10 in FIGS. 1A and 1B or 10' in FIG. 2. FIG. 3B illustrates a spraying machine 30' having a hopper 31' emptying into an aspirator 36' having a downstream restriction 38' with which it is in fluid communication. The emptying can be enhanced by providing external air pressure onto the contents of the hopper 31'. As in FIG. 3A, carrier gas from source C delivered through nozzle 40' aspirates the particles P to form a stream exiting the restriction 38' into the conduit 24' to be delivered thereby to a flame spraying lance. Instead of a venturi, FIG. 3C illustrates that the spraying machine 30'' may have a motor driven impeller 42 to impell the particles into which is added an appropriate amount of a carrier gas to form an entrained particle stream for delivery through conduit 24'' to a flame spraying apparatus.

The use of an aspirator in the illustrated forms on the inlet end of a lance or anywhere along the length of the lance introduces sufficient oxygen as the accelerator to optimize the oxygen-carrier gas-oxidization material-refractory material exit velocity at the outlet end of the lance.

The introduction of an inert carrier gas such as air into the particle stream from the spraying machine will introduce sufficient dilution effect so as to inhibit back-flash reactions when oxygen is added. Control of the ratio of carrier gas to oxygen eliminates or renders harmless any backflashes which may occur in the lance, and eliminates or minimizes the "tip" reactions which are found to occur at outlet end. Tip reactions cause buildup of refractory mass at the outlet end or along the length of the lance, and require the process to be discontinued until the lance is cleaned or replaced, causing delay.

It is important that the oxygen to carrier gas dilution ratio be in range of 5–1 to 30–1. The use of the aspirator on the lance inlet or along its length prior to the outlet provides the flexibility for application rates from as little as 1 lb./min. to 50 lbs./min.

Application rates of 100 lbs./min. can be achieved using proportionately larger lances and higher oxygen feed rates together with higher carrier gas/particle feed rates.

The dilution effect of the inert carrier allows the process to utilize one or more highly reactive oxidizable materials such as chromium, aluminum, zirconium and/or magnesium without encountering backflash problems.

The dilution effect of the inert carrier allows the process to utilize pre-fused refractory grain/powder which may contain a combination of up to 15% of iron oxides (FeO, $Fe_2O_3$, $Fe_3O_4$, or rust) which are known to cause explosions when mixed with pure oxygen without encountering backflash or explosion problems.

Adjustment of the oxygen/carrier gas/particle mixture within the parameters set out herein will allow the use of other highly active materials such as finely divided zirconium metal powder or materials containing up to 80% iron oxide.

The use of finely divided oxidizable powders in an aggregate amount of 8–12% is sufficient to create a high quality refractory mass with regard to mass chemistry, density and porosity when using this process to create magnesium oxide/chromium oxide/aluminum oxide refractory matrices. Such powders preferably consist of one or more of chromium, aluminum, zirconium, and/or magnesium metals; such powders produce magnesia/chromite, alumina/chromite, magnesite/alumina, and zirconia/chromite bond matrixes and/or any combination thereof. Such bond matrices will improve wear resistance in high temperature environments over silica type bonds produced by using less reactive silicon powder used by the prior art as part or all of the oxidizing materials.

Silicon powder can be used to add controlled percentages of silica to the final chemical analysis, thus allowing for a full spectrum of control over final chemical analysis. Such additions could substantially increase the total percentage of oxidizable powders since silicon provides relatively less heat of reaction than more reactive oxidizable powders such as aluminum or chromium or magnesium or zirconium. A typical substitution would be 2% of silicon for every one percent of other powder. Such substitution could be expected to add silica to the final refractory mass analysis. The use of finely divided oxidizable powders in an aggregate amount of 15–25% is sufficient to create a high quality refractory mass with regard to mass chemistry, density and porosity when using this process to create silicon carbide base refractories.

The preferred particle size of the oxidizable materials is below about 60 microns; the more preferred particle size is below about 40 microns and the most preferred particle size is below about 20 microns. Smaller particle sizes increase the rate of reaction and evolution of heat to result in more cohesive refractory masses being deposited.

The very fine particles of oxidizable material are substantially consumed in the exothermic reaction which takes place when the oxygen-carrier gas-oxidizable material-refractory material stream exits the lance. Any residue of the stream would be in the form of the oxide of the substances therein or in the form of a spinel created by the chemical combination of the various oxides created. In general the coarser the oxidizable particle, the greater the propensity for it to create the oxide rather than to be fully consumed in the heat of reaction. This is an expensive method of producing oxide, however, and it is preferred generally to use the very fine oxidizing particles as disclosed above and to achieve the desired chemistry by deliberate addition of the appropriate refractory oxide.

The use of chromic oxide as part of the chemistry of refractory masses used in high temperature conditions has long been recognized as a valuable addition to reduce thermal shock or spalling tendencies and enhance wear and erosion resistance characteristics. Chromium oxide occurs naturally in various parts of the world; although it is heat treated in various ways, such as by fusing, it contains by-products which are difficult or expensive to eliminate. One particular source has a high proportion of iron oxide as a contaminant. This material has proved to impart particularly good wear characteristics to refractory masses in certain applications.

Another material is produced by crushing refused grain brick such as was produced by Cohart. Some are known commercially as Cohart RFG or Cohart 104 Grades. Again some of these materials typically contain 18–22% of $Cr_2O_3$ and 6–13% of iron oxide. When using these materials in the presence of pure oxygen, violent backflashes occur. When diluted with an inert carrier before oxygen is added, however, backflashes are eliminated or reduced to a non-dangerous, non-violent level.

The ratio of carrier gas to oxygen has an important effect on the ability to create the correct conditions for the exothermic reaction. Too much air will dampen or cool the reaction resulting in high porosity of the formed mass and hence reduce wear characteristics of the mass. In addition, it will substantially increase the rebound percentage and hence increasing the cost of the mass. It can make the exothermic reaction difficult to sustain. It has been found that a spraying machine conveying the particles using air as the aspirant most preferably operates at 5–15 psi air, conveying the particles to the flame spraying apparatus using oxygen as the aspirant, preferably at 50–150 psi oxygen. In this case the same size nozzles for air and oxygen give an average most preferred dilution volume ratio of 10 to 1 oxygen to air. Dilution ratio as low as 5 to 1 oxygen to air and as high as 30 to 1 oxygen to air can be effective although at 30 to 1, one can begin to experience backflashes with particularly active materials such as iron oxide or chromium metal. The most ideal operating pressures are 8–12 psi air and 80–120 psi oxygen and as close as possible to 10 to 1 operating pressures, i.e., 8 psi air to 80 psi oxygen, and 12 psi air to 120 psi oxygen.

By adjusting the oxidizing/refractory oxide ratio to compensate for the melting point changes of the different refractory oxides, it is possible to create refractory masses of almost any chemical analysis. It has been found that when flame spraying $MgO/Cr_2O_3/Al_2O_3$ materials, oxidant mixtures of one or more of aluminum/chromium and/or magnesium allow accurate chemical analysis reproduction, low rebound levels (material loss) and high quantity and high quality refractory mass production with regard to density and porosity. The most ideal percentage by weight of oxidizing material in this type of mass was 8½–10½%.

The refractory oxide materials used can vary over a wide range of mesh gradings and still produce an acceptable refractory mass. High quality masses are obtained using refractory grains screened −10 to dust USS and containing as low as 2% −200 mesh USS. Other high quality masses are formed using refractory grains sized −100 to dust USS and containing over 50% −200 USS. In general, refractory mass build up is faster when coarser particles are used. Excessive percentages of coarse material can cause material settling in the feed hose and lower rates of refractory mass formation.

A major benefit of this invention is that refractory masses have been formed at rates of over 2,000 lbs. per hour. By increasing the feed rate of the carrier gas/particle mixture and increasing the size of the venturi and/or lance, it is projected that feed rates of 6,000 lbs. per hour and up can be achieved. It is important to maintain the oxygen/carrier gas ratio of between 5-1 oxygen/carrier gas and 30-1 oxygen/carrier gas in this scale up.

The best modes of practicing the invention can be further illustrated by the following examples.

EXAMPLE I

Refractory blocks/bricks in the tuyere line of a copper smelting converter were repaired in situ at or close to operating temperature by a process according to the invention using a mixture consisting of 91% of Crushed RFG bricks known in the trade as Cohart RFG containing screened −12 dust USS Mesh grading; 5% aluminum powder of 3 to 15 micron particles size average and 4% chromium powder 3 to 15 micron particles size average. The mixture was transported in a stream of air at 10 psi to the venturi on the inlet end of the lance where it was projected at a rate of 1700 lbs. per hour by a stream of oxygen at a pressure of 100 psi against the worn tuyere line which was at a temperature in excess of 1200° F. to form an adherent cohesive refractory repair mass.

EXAMPLE II

The process of Example I was repeated substituting 20% of crushed 93% $Cr_2O_3$ bricks with a typical mesh grading of −60 dust mesh for 20% of the RFG bricks in Example I.

EXAMPLE III

The process of Example I was repeated using 0.5% magnesium powder and 1% additional chromium powder both with an average micron size of between 3–15 microns.

EXAMPLE IV

The process of Example I was repeated except that 1% aluminum powder was replaced by 1% of RFG bricks giving 92% RFG bricks, 4% aluminum powder and 4% chromium powder.

EXAMPLE V

The process of Example I was repeated, but using the following mixture:

| | Amount by Weight % | Average Grain Size |
|---|---|---|
| MgO | 59–68% | −12 to dust USS |
| $Cr_2O_3$ | 13–23% | −12 to dust USS |
| $Fe_2O_3$ | 5–9% | −12 to dust USS |
| Al metal powder | 5% | 3–15 microns |
| Cr metal powder | 3% | 3–15 microns |
| Mg metal powder | .5% | 3–15 microns |
| Si metal powder | 2% | 3–15 microns |

EXAMPLE VI the process of Example I was repeated, but using the following mixture:

| | |
|---|---|
| MgO | 49–53% |
| $Cr_2O_3$ | 25–27% |
| $Fe_2O_3$ | 4–6% |
| SiO | 1–2% |
| Al metal powder | 9% |
| Cr metal powder | 6% |
| Mg metal powder | .5% |

EXAMPLE VII

The process of Example I was repeated, but using the following mixture:

| | |
|---|---|
| MgO | 49–53% |
| $Cr_2O_3$ | 25–27% |
| $Fe_2O_3$ | 4–6% |
| SiO | 1–2% |
| Al metal powder | 9% |
| Cr metal powder | 7.5% |
| Mg metal powder | .5% |

EXAMPLE VIII

The process of Example I was repeated, but using the following mixture:

| | Purity of Material | % By Weight in Recipe |
|---|---|---|
| MgO | 96% | 63% |
| $Cr_2O_3$ | 93% | 23% |
| Al Metal Powder | 99.7% | 5% |
| Cr Metal Powder | 99.9% | 7% |

EXAMPLE IX

The process of Example I was repeated, but using the following mixture:

| | % By Weight in Recipe |
|---|---|
| MgO | 63% |
| $Cr_2O_3$ | 23% |
| Al Metal Powder | 7% |
| Cr Metal Powder | 7% |

EXAMPLE X

The process of Example I was repeated using the following mixture:

| | Variance Purity of Material | % by Weight in Recipe |
|---|---|---|
| MgO | 96% | 61.5% |
| Coke Dust | 97% Carbon | 25% |
| Al Metal Powder | 99.7% | 5% |
| Cr Metal Powder | 99.9% | 9% |
| Mg Metal Powder | 99.9% | .5% |

EXAMPLE XI

The process of Example I was repeated using the following mixture:

| | % by Weight in Recipe |
|---|---|
| MgO | 60.5% |
| Coke Dust | 25% |
| Al Metal Powder | 7% |
| Cr Metal Powder | 7% |
| Mg Metal Powder | 5% |

EXAMPLE XII

The process of Example I was repeated, but using the following mixture:

| | Purity of Material | % by Weight in Recipe |
|---|---|---|
| MgO | 97.3% MgO | 88.5% |
| Al Metal Powder | 99.7% | 6% |
| Cr Metal Powder | 99.9% | 5% |
| Mg Metal Powder | 99.9% | 0.5% |

EXAMPLE XIII

The process of Example I was repeated, but using the following mixture:

| | Purity of Material | % By Weight in Recipe |
|---|---|---|
| Al O Refractory Grain | 99.8% | 87% |
| Al Metal Powder | 99.7% | 4.5% |
| Cr Metal | 99.9% | 8% |
| Mg Metal | 99.9% | 0.5% |

EXAMPLE XIV

The process of Example I was repeated, but using the following mixture:

| | % By Weight in Recipe |
|---|---|
| Al O Refractory Grain | 87% |
| Al Metal Powder | 9% |
| Cr Metal | 3.5% |
| Mg Metal | 0.5% |

EXAMPLE XV

The process of Example I was repeated, but using the following mixture:

| | Purity of Material | % by Weight in Recipe |
|---|---|---|
| $Zr_2O_3$ Refractory Grain (−50 + 100 Mesh) | 99.5% | 87% |
| Al Metal Powder | 99.7% | 4.5% |
| Cr Metal Powder | 99.9% | 8% |
| Mg Metal Powder | 99.9% | 0.5% |

EXAMPLE XVI

The process of Example I was repeated, but using the following mixture:

| | % By Weight in Recipe |
|---|---|
| $Zr_2O_3$ (−50 + 100 Mesh) | 87% |
| Al Metal Powder | 9% |
| Cr Metal Powder | 3.5% |
| Mg Metal Powder | 0.5% |

EXAMPLE XVII

A mixture was prepared containing by weight 79% of 99% silicon carbide graded −50-100 USS mesh and 16.25% and 98% pure silicon metal powder graded −325 USS mesh, 4% of pure aluminum powder graded −325 USS mesh and 0.75% and 99.9% pure magnesium powder graded −325 USS mesh. This mixture was projected through a double venturi air oxygen system in the same way as specified in Example I against a silicon carbide tray column used in the fire refining of zinc powder. Zince liquid metal and zinc oxide leaks were cooled and an adherent fused refractory coating was formed.

EXAMPLE XVIII

The process of Example XII was repeated, using the following mixture:

| | % by Weight in Recipe |
|---|---|
| SiC 99.5% - 200xD Uss Mesh | 79% |
| $SiO_2$ powder - 325xD | 16.25% |
| Al powder - 325xD | 4% |
| Mg powder - 325xD | 0.75% |

EXAMPLE XIX

The process of Example XII was repeated, using the following mixture:

| | % By Weight in Recipe |
|---|---|
| SiC 99.5% - 200xD Uss Mesh | 80.5% |
| $SiO_2$ powder - 325xD | 14% |
| Al powder - 325xD | 5% |
| Mg powder - 325xD | 0.5% |

EXAMPLE XX

The process of Example XII was repeated, using the following mixture:

| | % by Weight in Recipe |
|---|---|
| SiC 99.5% - 200xD Uss Mesh | 77% |
| $SiO_2$ powder - 325xD | 19.5% |
| Al powder - 325xD | 3% |
| Mg powder - 325xD | 0.5% |

The processes in Examples I, IV were performed using pure oxygen at 100 psi injected at the spraying machine venturi and aspirating these the recipes of Examples I and IV at approximate rates of 1 lb. per minute. Back flashes were encountered which made the recipes unusable. The examples were then repeated using a dilution and relative pressures of 8:1 to 12:1 oxygen to air as described at application rates of 1 lb. per minute, 3 lbs. per minute, 9 lbs. per minute, 15 lbs. per minute, and 33 lbs. per minute, without encountering backflashes serious enough to prevent their usage. The most desirable recipes in terms of buildup and quality and rebound was that of Example I and Example XVII, but all mixtures tested produced adherent fused refractory masses.

Variations and modifications of the invention will be apparent to those skilled in the art from the above detailed description. Therefore, it is to be understood that, within the scope of the appended claims, the invention can be practiced otherwise than as specifically shown and described.

I claim:

1. A method of forming a refractory mass comprising the steps of:

(a) delivering through an oxygen outlet nozzle a high pressure stream of oxygen to a flame spraying apparatus, the high pressure stream of oxygen having a pressure of 50 psi to 150 psi;

(b) delivering into the high pressure stream of oxygen in the flame spraying apparatus, a mixture comprising a carrier gas and entrained particles of an oxidizable material and of an incombustible refractory material, the carrier gas having a pressure of 5 psi to 15 psi, to form an oxygen-carrier gas-oxidizable material-refractory material stream, said mixture being delivered in an amount to effect a volume ratio of from 5 1 to about 30 to 1 oxygen to carrier gas at their respective pressures;

(c) projecting the oxygen-carrier gas-oxidizable material-refractory material stream from an outlet nozzle of the flame spraying apparatus toward a refractory lining;

(d) burning the oxidizable material; and (e) forming a refractory mass.

2. The method of claim 1 wherein the step (b) delivering is carried out to provide a volume ratio of oxygen to carrier gas of from about 8 to 1 to about 12 to 1.

3. The method of claim 1 further including after step (b) the steps of mixing the oxygen gas and the carrier gas and entrained particles of the oxidizable material and the refractory material in a restriction slightly downstream of the oxygen outlet nozzle and upstream from the outlet nozzle of the flame spraying apparatus to accelerate the oxygen-carrier gas oxidizable material-refractory material stream so that the velocity of the accelerated stream is greater than the velocity of the mixture.

4. The method of claim 1 wherein the oxidizable material comprises one or more of chromium, zirconium, silicon, aluminum and magnesium, and he refractory material comprises oxides of one or more of chromium, zirconium, aluminum and magnesium.

5. The method of claim 1 wherein the oxidizable material comprises 8 to 17% by weight of the particles in the mixture.

6. The method of claim 1 wherein the refractory material comprises one or more of magnesium oxide, chromium oxide and aluminum oxide, the oxidizable material comprises one or more of chromium, aluminum and magnesium, and the oxidizable material comprises 8 to 12% by weight of the particles in the mixture.

7. The method of claim 1 wherein the oxidizable material comprises one or more of silicon aluminum, chorium, and magnesium, and the refractory material comprises silicon carbide, wherein the oxidizable material comprises 15 to 25% by weight of the particles in the mixture.

8. The method of claim 1 wherein the oxidizable material has an average grain size of less than about 60 microns.

9. A method of claim 1 wherein the refractory material comprises one or more of chromium oxide, zirconium oxide, silicon oxide, magnesium oxide and aluminum oxide.

10. The method of claim 1 wherein the mixture further comprises iron oxide.

11. The method of claim 1 wherein the carrier gas and the entrained particles are aspirated by the high pressure stream of oxygen through a venturi located in a flame spraying lance.

12. A method of claim 1 wherein the refractory mass comprises magnesia and chromite.

13. A method of forming a refractory mass comprising the steps of:

(a) forming a particle stream of carrier as and particles of an oxidizable material and a refractory material, wherein the oxidizable material comprises one or more of aluminum, magnesium, chromium and zirconium;

(b) delivering the particle stream into an oxygen gas stream that is at substantially higher pressure than the carrier gas in a flame spraying apparatus, mixing the particle stream with the high pressure oxygen stream to form a reaction stream wherein the proportion of oxygen to carrier gas is from 5 to 1 to about 30 to 1 by volume and so that the reaction stream has a greater velocity than the particles stream, the mixing of the oxygen stream and the particles stream being accomplished by flowing them through a restriction it eh flame spraying apparatus;

(c) projecting the reaction stream toward a refractory lining;

(d) burning the oxidizable material in the reaction stream; and (e) forming a refractory mass.

14. A method of claim 13 wherein the step of delivering is carried out to provide a volume ratio of from about 8 to 1 to about 12 to 1 oxygen gas to carrier gas.

15. A method of forming a refractory mass comprising the steps of:

(a) aspirating into a flame spraying apparatus by means of a high pressure stream of oxygen, a mixture comprising carrier gas and entrained particles of an oxidizable material and of an incombustible refractory material to form an oxygen-carrier gas-oxidizable material-refractory material stream, the refractory material comprising one or more of magnesium oxide, zirconium oxide, chromium oxide and aluminum oxide, the oxidizable material comprising one or more of chromium, zirconium, aluminum and magnesium and being presenting an amount comprising of form about 8 to 12% by weight of the particles in the mixture, the oxygen and carrier gas being present in a volume ratio of from about 8 to 1 to about 12 to 1, respectively;

(b) mixing the oxygen stream and the carrier gas and entrained particles i a restriction in the flame spraying apparatus;

(c) projecting the oxygen-carrier gas-oxidizable material-refractory material stream toward a refractory lining;

(d) burning the oxidizable material; and (e) forming a refractory mass.

16. A method of forming a refractory mass using a flame spraying apparatus comprising the steps of:

(a) forming a particle stream of a mixture of particles of an oxidizable material, a refractory material and a carrier gas, said oxidizable material comprising one or more of chromium, magnesium, zirconium, silicon and aluminum;

(b) delivering into a flame spraying lance an oxygen gas stream having a substantially higher pressure than the particle stream;

(c) delivering the particle stream into the oxygen stream in an amount to achieve a volume ratio of from 5 to 1 to about 30 to 1 oxygen gas to carrier gas;

(d) mixing the particle stream and the oxygen stream to form a reaction stream having a greater velocity than the velocity of the particle stream;

(e) projecting the reaction stream from the flame spraying lance toward a refractory lining;

(f) combusting the oxidizable particles of the reaction stream; and (g) forming a refractory mass.

17. A method of forming a refractory mass according to claim 16 wherein the carrier gas and the entrained particles of the particle stream are aspirated by the high pressure stream of oxygen through a venturi located in the flame spraying lance.

18. A method of forming a refractory mass according to claim 16 wherein the carrier gas is air.

19. A method of forming a refractory mass according to claim 16 wherein the refractory mass comprises magnesia and chromite.

20. A method of forming a refractory mass according to claim 16 wherein the refractory material comprising one or more of magnesium oxide, aluminum oxide, chromium oxide, zirconium oxide, silicon oxide, silicon carbide and iron oxide.

21. A method of forming a refractory mass according to claim 16 wherein the oxidizable material has an average grain size of less than about 60 microns.

22. A method of forming a refractory mass according to claim 16 wherein the pressure of the carrier gas is from 5 too 15 psi, and the pressure of the oxygen gas is from 50 to 150 psi.

23. A method of forming a refractory mass according to claim 16 wherein the volume ratio is from about 8 to 1 to about 12 to 1 oxygen gas to carrier gas.

24. A method of forming a refractory mass according to claim 16 wherein the mixing of the particle stream and the oxygen stream is in a restriction í the flame spraying lance.

25. A method o forming a refractory mass according to claim 16 wherein the oxidizable material includes silicon and the refractory material includes silicon carbide and wherein the oxidizable material comprises from about 15% to about 25% by weight of the particles of the mixture.

* * * * *

UNITED STATES PATENT AND TRADEMARK OFFICE
CERTIFICATE OF CORRECTION

PATENT NO. : 5,013,499

DATED : May 7, 1991

INVENTOR(S) : David C. Willard

It is certified that error appears in the above-identified patent and that said Letters Patent is hereby corrected as shown below:

Column 4, line 11, after "24", insert -- through the conduit 22---.

Column 8, line 13, delete "the" and insert --The--.

Column 11, line 63, delete " 5 1" and insert -- 5 to 1--.

Column 12, line 18, delete "he" and insert -- the--.

Column 12, line 53, delete "as" and insert --gas--.

Column 12, line 64, delete "particles" and insert --particle--.

Column 12, line 66, delete "particles" and insert -- particle--.

Column 12, line 67, delete "eh" and insert -- the--.

Column 13, line 22, delete "presenting" and insert --present in --.

UNITED STATES PATENT AND TRADEMARK OFFICE
CERTIFICATE OF CORRECTION

PATENT NO. : 5,013,499

DATED : May 7, 1991

INVENTOR(S) : David C. Willard

It is certified that error appears in the above-identified patent and that said Letters Patent is hereby corrected as shown below:

Column 13, line 23, delete" form" and insert --from--.

Column 13, line 27, delete "i" and insert --in--.

Column 14, line 32, delete "too" and insert --to--.

Column 14, line 38, delete "i" and insert --in--.

Column 14, line 40, delete "o" and insert --of--.

Signed and Sealed this

Thirteenth Day of October, 1992

*Attest:*

DOUGLAS B. COMER

*Attesting Officer* *Acting Commissioner of Patents and Trademarks*